United States Patent Office 2,865,708
Patented Dec. 23, 1958

2,865,708

PROCESS OF RECOVERING COBALT, CERIUM, AND MANGANESE CATALYSTS

Robert L. Dinsmore, Long Beach, and Warren V. Spencer, Compton, Calif., assignors to Richfield Oil Corporation, Los Angeles, Calif., a corporation of Delaware No Drawing. Application August 26, 1955
Serial No. 530,894

6 Claims. (Cl. 23—61)

The present invention relates to a process for the recovery of spent catalyst-metal components from reaction mixtures produced by the oxidation of xylenes with an oxygen-containing gas.

Known processes for the air oxidation of xylenes employ various catalyst compositions containing cobalt, cerium and manganese, the preferred catalysts being those which contain cobalt, and various xylene containing feed stocks including individual xylene isomers, closely fractionated mixtures of xylene isomers and wide boiling range xylene fractions containing significant amounts of ethyl benzene, e. g. fractions obtained by the catalytic cracking of hydrocarbon oils. A process for the production of toluic acids by the liquid phase air oxidation of xylenes is described in U. S. Patent 2,696,499. This process provides for the oxidation of xylenes to toluic acids at a rapid rate in good yield with a minimum production of phthalic acids without the use of an extraneous solvent for the reaction mixture and employs air or other oxygen-rich gas as the oxidizing agent. Suitable catalysts include cobalt, manganese and cerium salts which are dispersible or soluble in the reaction medium, particularly cobalt soaps, such as the toluate. The oxidation reaction is carried out at temperatures within the range from about 130 to 190° C. or preferably from about 140 to 150° C. and is allowed to proceed until 10 to 50 percent or preferably about 20 to 40 percent of the aromatics are converted or oxidized to oxygen-containing compounds. The reaction mixture is allowed to absorb approximately 5 to 15 percent of oxygen based on the aromatics content. The optimum pressure for the oxidation reaction is a function of the temperature and economic factors. Since no solvent is employed, the temperature of the oxidation reaction controls the water content of the reaction mixture at a given pressure. Conversely, at a given reaction temperature the working pressure in the reaction zone is not allowed to exceed that which allows the majority of the water formed in the reaction to be removed in the effluent gas stream. Excess water is to be avoided in the reaction since it poisons the catalyst, possibly by removing catalyst from the hydrocarbon layer. The reaction pressure is normally maintained in the range from about 100 to 500 p. s. i. g. and preferably within the range from about 100 to 250 p. s. i. g. A pressure of 200 p. s. i. g. allows water removal in the effluent gas stream at an adequate oxidation rate and is economical of the materials of construction of the reaction vessel. A catalyst useful in the process can be prepared by pouring molten cobaltous toluate into cold xylene to produce a fine dispersion with good flow characteristics.

The present invention provides a method for recovering cobalt, manganese or cerium catalyst components from reaction mixtures produced by the oxidation of xylenes with an oxygen-containing gas in which appreciable amounts of phthalic acids are produced. Minor amounts of secondary reaction products are inevitably formed in the oxidation of xylenes by any of the known methods. The amount and type of the secondary reaction products depend upon the boiling range and composition of the feed stock employed as well as the operating conditions of the oxidation reaction. For example, it has been found that when a mixture of xylene isomers, obtained from the catalytic cracking of petroleum hydrocarbons, which contains significant quantities of ethyl benzene, lesser quantities of paraffins and naphthenes and small amounts of impurities such as nitrogen and sulfur compounds, is oxidized with air in the presence of a cobalt catalyst under conditions of temperature and pressure suitable for the production of toluic acids, minor amounts of phthalic acid, benzoic acid, aldehydes, ketones and other reaction products are formed. The phthalic acids produced, particularly terephthalic acid, combine with the cobalt catalyst, for example, to form an isoluble salt which has no catalytic activity. The cobalt terephthalate, together with excess phthalic acid and other insoluble contaminants such as corrosion products, separates from the reaction mixture and can be readily recovered by filtration. Thus, our invention is concerned with the recovery of the metal component of cobalt, manganese or cerium catalysts from the reaction product from the oxygen-containing gas oxidation of xylenes in which sufficient phthalic acids are produced to combine with a substantial portion of the metal of the catalyst. The purpose of the reaction may be to produce toluic acid, phthalic acid or their mixture, but in any event reaction conditions must be sufficiently severe to produce at least an appreciable portion of phthalic acids.

The nature of the insoluble compounds which separate from the reaction mixtures in the air oxidation of xylenes varies with the type of feed stock employed. For example, it has been observed that closely fractionated xylene isomers or mixtures produce insolubles from which the catalyst can be readily recovered in an active form by hydration e. g., as described in U. S. Patent 2,680,757, or other means. When impure feed stocks or stocks boiling over a wide range are employed, however, the insolubles produced in the oxidation reaction are of a different character which makes it very difficult to recover or reactivate the catalytic metal in a satisfactory manner by simple hydration procedures. The present invention, while applicable to the recovery of metal catalyst components from any oxidized-xylene reaction mixture is particularly adapted to recovering catalyst from the type of insoluble materials which have previously been considered unregenerable.

The catalyst metal recovery process of the present invention comprises reacting insoluble material separated from oxidized xylene reaction mixtures with an alkaline salt or base of an alkali metal, particularly sodium and potassium. The new method makes possible substantially 100 percent recovery of the catalytic metal from the reaction mixture and in addition restores the catalyst to a form in which it can be used without further processing, although if desired, the recovered catalyst can be reacted with toluic acid or the like to form the commonly used metallic salts such as cobalt toluate.

In general, the new method involves heating the insoluble catalyst-containing solids from the oxidized xylene reaction mixture with an aqueous solution of an alkaline salt or base of an alkali metal, e. g. sodium hydroxide, sodium carbonate, potassium hydroxide, potassium carbonate or the like at an elevated temperature. The reaction is allowed to proceed until substantially complete which usually requires several hours; the time should be held to a minimum for economic reasons, however. Periods of about 2 to 16 hours are generally sufficient with about 5 to 16 hours being preferred. During the reaction period, free phthalic acid and phthalic acid combined as a salt with cobalt or other catalytic metal in the insoluble material are converted to water-soluble form. The catalytic metal present in the filter cake, for example cobalt, is converted to the water-insoluble cobalt or other metal hydroxide, carbonate or the like depending upon which type of alkali metal salt or base is employed. The insoluble cobalt hydroxide or other catalyst-containing salt or base is recovered, as by filtration, from the aqueous solution and can be reused by suspension in hydrocarbons such as xylene, by solution in heavy neutrals, by reaction with excess toluic acid to produce a solution of cobalt toluate in toluic acid, or by any of the other methods generally employed in the art.

In order to recover the catalyst in an active form under atmospheric pressure conditions, it is necessary to react the insoluble material with the aqueous solution of an alkaline salt or base of an alkali metal at temperatures in excess of about 75° F. In the case of cobalt, temperatures ranging from about 100 to 200° F. can be used with advantage. The preferred temperatures range from about 100 to 300° F. The upper temperatures in this range, however, require superatmospheric pressures to maintain the aqueous system in the liquid phase.

The new method of catalyst recovery presents a number of economic advantages. Chemical costs are low since low-priced materials such as sodium hydroxide and sodium carbonate are used in amounts only slightly in excess of stoichiometric quantities. A second advantage of the new process is that it eliminates catalyst preparation steps when the recovered catalyst is reused directly. A third advantage is that the catalyst recovered by this method, when used directly, does not introduce large amounts of foreign material to the reaction mixture. A fourth advantage is that the terephthalic acid and other valuable water insoluble acids may be recovered simply by acidifying the sodium salts with a low-cost mineral acid.

EXAMPLE I

Approximately 9000 grams of catalyst cake, obtained from a reaction mixture produced by the air oxidation of a fraction containing a mixture of para, meta and ortho xylenes which contained about 7500 grams of phthalic acid, was washed with 10 liters of xylene and 5 liters of pentane and dried to remove any traces of soluble products. The recovery amounted to 8,368 grams of dried cake. The dried cake was suspended in sufficient caustic (30 liters of 0.65 percent concentration) to raise the pH to approximately 11 and was held at a temperature of 180° for a period of 5 hours. Following the reaction, the mixture was centrifuged; 577 grams of product being recovered without loss of cobalt. The analysis of the filtrate containing the soluble salts of phthalic acid indicated that the cobalt content was essentially zero.

A cobalt balance was made on another batch of filter cake, containing about 87 percent of phthalic acid, obtained similarly to that described above and containing approximately 7.7 weight percent to show the degree of cobalt recovery obtained by this method. This data is presented in Table I.

Table I

|  | Dried Filter Cake | Recovered Cobalt Hydroxide |
| --- | --- | --- |
| Weight, grams | 100 | 17 |
| Ash, Wt. Percent | 11.9 | 69.4 |
| Ash, grams | 11.9 | 11.8 |
| Cobalt in Ash, Wt. Percent | 65 | 65 |
| Cobalt in Ash, grams | 7.7 | 7.7 |

EXAMPLE II

One hundred grams of xylene-washed dried filter cake obtained from a reaction product derived by the air oxidation of a xylene fraction containing substantial amounts of each of the three isomers and about 88% of phthalic acids and containing spent catalyst was slurried with 400 cc. of dilute sodium carbonate solution. The pH of the mixture was 9. The mixture was held at this pH and a temperature of 190° F. for a period of 16 hours. It was then filtered and the recovered insoluble cobalt salt water washed. Fifteen percent, by weight, of the original cake was recovered as insoluble cobalt salt. The recovery of the cobalt metal was essentially 100%.

The following are examples illustrating reuse of the recovered catalyst.

EXAMPLE III

One-fourth gram of the recovered cobalt catalyst of Example I was added to 50 ml. of mixed xylenes and the xylene-catalyst mixture was subjected to 100 lbs. of oxygen pressure at a temperature of 212° F. for a period of 2 hours. A comparison of the appearance and properties of the resulting reaction products with those obtained by the use of fresh, conventional catalyst indicated that the activity of the recovered catalyst was normal.

EXAMPLE IV

One part of the recovered cobalt from Example I and 4 parts of toluic acid were stirred together at 300° F. for 15 minutes and then poured into 7 times by weight of stirred, mixed xylenes. Practically all of the product was dissolved or suspended, forming a purplish, brown solution which left no residue when filtered through a 100 mesh screen. When tested in a pilot plant, catalyst prepared by this method gave a normal reaction in the air oxidation of xylenes.

EXAMPLE V

One part of recovered cobalt hydroxide from Example I was refluxed with 4 parts of toluic acid and 50 parts by weight of mixed xylenes for one-half hour. Catalyst prepared by this method contained 49 percent of the cobalt in solution and 39 percent as a colloidal suspension. This catalyst showed normal activity when tested under pilot plant operating conditions, for producing toluic acids by the air oxidation of xylenes.

It is to be understood that the examples and data given above are merely illustrative and are not to be construed as limiting the invention claimed below.

We claim:

1. A process for recovering a catalytic metal selected from the group consisting of cobalt, cerium and manganese, in a form active for the oxygen-containing gas oxidation of xylenes, from a reaction mixture produced by oxidizing xylene with an oxygen-containing gas while obtaining at least a substantial portion of phthalic acid, said reaction mixture having suspended therein insoluble material containing spent catalytic metal, which comprises the steps of separating said insoluble material from said reaction mixture, treating for a period of several hours at a temperature in excess of about 75° F. said insoluble material with an aqueous solution of a material selected from the group consisting of an alkaline salt and a base of an alkali metal, and separating the resulting precipitated alkaline salt of the catalytic metal from said solution.

2. A process for recovering cobalt in a form active for the oxygen-containing gas oxidation of xylenes from a reaction mixture produced by oxidizing xylene with an oxygen-containing gas while obtaining at least a substantial portion of phthalic acid, said reaction mixture having suspended therein insoluble material containing spent cobalt catalyst, which comprises the steps of separating said insoluble material from said reaction mixture, treating for a period of several hours at a temperature in excess of about 75° F. said insoluble material with an aqueous solution of sodium hydroxide, and separating the resulting precipitated cobalt hydroxide from said solution.

3. A process for recovering cobalt in a form active for the oxygen-containing gas oxidation of xylenes from a reaction mixture produced by oxidizing xylene with an oxygen-containing gas while obtaining at least a substantial portion of phthalic acid, said reaction mixture having suspended therein insoluble material containing spent cobalt catalyst, which comprises the steps of separating said insoluble material from said reaction mixture, treating for a period of several hours at a temperature in excess of about 75° F. said insoluble material with an aqueous solution of sodium carbonate, and separating the resulting precipitated cobalt carbonate from said solution.

4. The method of claim 1 in which the treating is conducted for about 2 to 16 hours at a temperature of about 100 to 300° F.

5. The method of claim 2 in which the treating is conducted for about 2 to 16 hours at a temperature of about 100 to 300° F.

6. The method of claim 3 in which the treating is conducted for about 2 to 16 hours at a temperature of about 100 to 300° F.

References Cited in the file of this patent

UNITED STATES PATENTS

| | | |
|---|---|---|
| 2,697,723 | Carlston et al. | Dec. 21, 1954 |
| 2,727,921 | Taves | Dec. 20, 1955 |